United States Patent [19]
Frey, Jr.

[11] Patent Number: 6,089,306
[45] Date of Patent: Jul. 18, 2000

[54] RATCHET TYPE CAM LOCK FOR A ROLLER

[75] Inventor: Sydney W. Frey, Jr., Brookfield, Wis.

[73] Assignee: White Consolidated Industries, Inc., Cleveland, Ohio

[21] Appl. No.: 09/192,136

[22] Filed: Nov. 13, 1998

[51] Int. Cl.[7] ...................................................... E06B 9/56
[52] U.S. Cl. ........................... 160/302; 160/67; 160/300; 160/305; 188/82.2; 74/577 R
[58] Field of Search ................................. 160/45, 46, 67, 160/68, 296, 300, 301, 302, 303, 305; 74/577 R, 577 M, 577 S; 188/60, 82.7, 82.77; 135/88.01, 88.12

[56] References Cited

U.S. PATENT DOCUMENTS

| | | |
|---|---|---|
| 126,666 | 5/1872 | Young . |
| 127,274 | 5/1872 | Scott . |
| 521,276 | 6/1894 | Stahl ........................................ 160/300 |
| 583,830 | 6/1897 | Wiley . |
| 705,594 | 7/1902 | Mathers . |
| 882,082 | 3/1908 | Schroyer . |
| 1,050,703 | 1/1913 | Siever et al. . |
| 1,133,511 | 3/1915 | Stutler . |
| 1,417,104 | 5/1922 | Pachesa .................................. 160/302 |
| 1,568,203 | 1/1926 | Bernard .................................. 160/300 |
| 1,659,526 | 2/1928 | Harader ................................. 160/300 |
| 1,806,549 | 5/1931 | Wallace . |
| 2,019,085 | 10/1935 | Miller . |
| 2,249,114 | 7/1941 | Coffman . |
| 2,761,029 | 8/1956 | Peabody . |
| 2,788,791 | 4/1957 | Pospisl et al. . |
| 2,812,809 | 11/1957 | Nicholas . |
| 2,889,840 | 6/1959 | McIlwaine . |
| 2,920,501 | 1/1960 | Couch . |
| 3,021,090 | 2/1962 | Becker . |
| 3,274,676 | 9/1966 | Gallagher et al. . |
| 3,324,869 | 6/1967 | Duda . |
| 3,612,145 | 10/1971 | Darula et al. . |
| 3,779,302 | 12/1973 | Akers et al. . |
| 3,826,271 | 7/1974 | Sattler et al. . |
| 3,870,096 | 3/1975 | Horrell . |
| 3,897,024 | 7/1975 | Takada et al. . |
| 3,918,510 | 11/1975 | Hayward . |
| 3,955,611 | 5/1976 | Coles et al. . |
| 4,089,230 | 5/1978 | Nelson . |
| 4,112,996 | 9/1978 | Föhl . |
| 4,117,876 | 10/1978 | Bennett . |
| 4,125,142 | 11/1978 | Föhl . |
| 4,180,117 | 12/1979 | Greer . |
| 4,195,877 | 4/1980 | Duda . |
| 4,262,955 | 4/1981 | Duda . |
| 4,346,749 | 8/1982 | Singletary et al. . |
| 4,524,791 | 6/1985 | Greer . |
| 4,563,911 | 1/1986 | Chauvigne ........................... 74/577 X |
| 4,607,654 | 8/1986 | Duda . |
| 4,658,877 | 4/1987 | Quinn . |
| 4,705,148 | 11/1987 | Zindler . |
| 4,759,396 | 7/1988 | Quinn . |
| 4,770,223 | 9/1988 | Quellette . |

(List continued on next page.)

FOREIGN PATENT DOCUMENTS

| | | |
|---|---|---|
| 17930 | 2/1930 | Australia . |
| 559055 | 3/1957 | Italy ...................................... 160/302 |
| 10728 | of 1899 | United Kingdom . |
| 6413 | of 1899 | United Kingdom . |

OTHER PUBLICATIONS

Photo of Lock For a Roller.

Primary Examiner—Daniel P. Stodola
Assistant Examiner—Bruce A. Lev
Attorney, Agent, or Firm—Pearne & Gordon LLP

[57] ABSTRACT

A hub provided at an end of a roller rotates with the roller. A stationary cap mounted to an axle of the roller is positioned adjacent the hub. A pawl pivots on the cap and is movable to engage gears on the hub. The pawl has two abutment surfaces mounted. The pawl pivots between a first position wherein one of the abutment surfaces engages the geared surface to prevent rotation of the hub in a first direction and a second position wherein the other abutment surfaces engages the geared surface to prevent rotation of the hub in a second direction.

16 Claims, 4 Drawing Sheets

U.S. PATENT DOCUMENTS

| | | |
|---|---|---|
| 4,838,333 | 6/1989 | Mottura . |
| 5,078,198 | 1/1992 | Tedeschi . |
| 5,494,093 | 2/1996 | Eiterman . |
| 5,649,671 | 7/1997 | L'Host .............................. 74/577 M X |
| 5,690,317 | 11/1997 | Sandsborg . |
| 5,732,756 | 3/1998 | Malott . |
| 5,752,536 | 5/1998 | Becker . |
| 5,848,629 | 12/1998 | Baka ................................. 188/82.7 X |

6,089,306

RATCHET TYPE CAM LOCK FOR A ROLLER

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

This invention relates generally to the field of awnings and specifically to a locking mechanism for an awning roller.

Awnings commonly include a canopy having one edge attached to a wall and an opposite edge attached to a roller. The roller rotates on an axle supported on support arms at each end of the roller. The support arms are pivotably attached to the wall. The roller rotates on the axle so that the canopy can be rolled on the roller for storage. The roller is spring loaded to facilitate rolling of the awning by a torsion spring, for example. It is desirable to lock the roller in position when the awning is in a stored or deployed position. In particular, roller locks are known that toggle between a "roll up" position, which prevents deployment and permits retraction of the canopy, and a "roll down" position, which prevents retraction and permits deployment of the canopy. Examples of roller locks are shown in U.S. Pat. No. 4,607,654 to Duda, U.S. Pat. No. 4,759,396 to Quinn, and U.S. Pat. No. 4,770,223 to Ouellette.

BRIEF SUMMARY OF THE INVENTION

The present invention provides a roller lock including an axle and a hub disposed for rotation on the axle and having a geared surface. A cap is mounted stationary relative to the axle. A pawl has two abutment surfaces and is mounted for rotation on the cap between a first position wherein one of the abutment surfaces engages the geared surface to prevent rotation of the hub in a first direction and a second position wherein the other abutment surfaces engages the geared surface to prevent rotation of the hub in a second direction.

A pawl pivot and lever shaft are mounted to the cap. A handle is provided for pivoting the lever shaft. A lever is mounted to the lever shaft and operated by the handle to engage and rotate the pawl. The geared surface is an interior surface of an annular ring. The hub is mounted on an end of a roller tube and the axial flange extends longitudinally away from the roller. The cap includes axial projections defining stops limiting rotational travel of the lever. A spring biases the pawl toward a respective one of the first or second positions to which the lever has rotated the pawl. A first spring mount projects radially from the shaft and a second spring mount is disposed at the pawl in an offcenter position with respect to a rotational axis of the pawl, wherein the spring is secured to the first and second spring mounts. The pawl includes shoulders for being engaged by the lever, the shoulders being positioned so that operation of the lever in one direction rotates the pawl in one direction and operation of the lever in another direction rotates the pawl in another direction to force the pawl to disengage when its direction is reversed. This assures the operator that the pawl has been disengaged from the teeth and the roller can be rotated in a direction corresponding to the position of the handle. The lever nests between the shoulders. The shoulders and lever are shaped and positioned such that the lever engages the shoulder to prevent rotation of the pawl beyond the neutral position unless the lever is rotated. The abutment surfaces are parallel, oppositely facing surfaces radially spaced from the pawl pivot. The lever includes a pair of parallel, spaced drive surfaces laterally offset from an axial centerline of the lever shaft. The cap and hub are provided with passages that can be aligned and further comprising locking pin that can be inserted in the aligned passages to prevent relative rotation of the cap and hub. A spring urges rotation of the roller in at least one direction.

DESCRIPTION OF THE INVENTION

Figure 1:
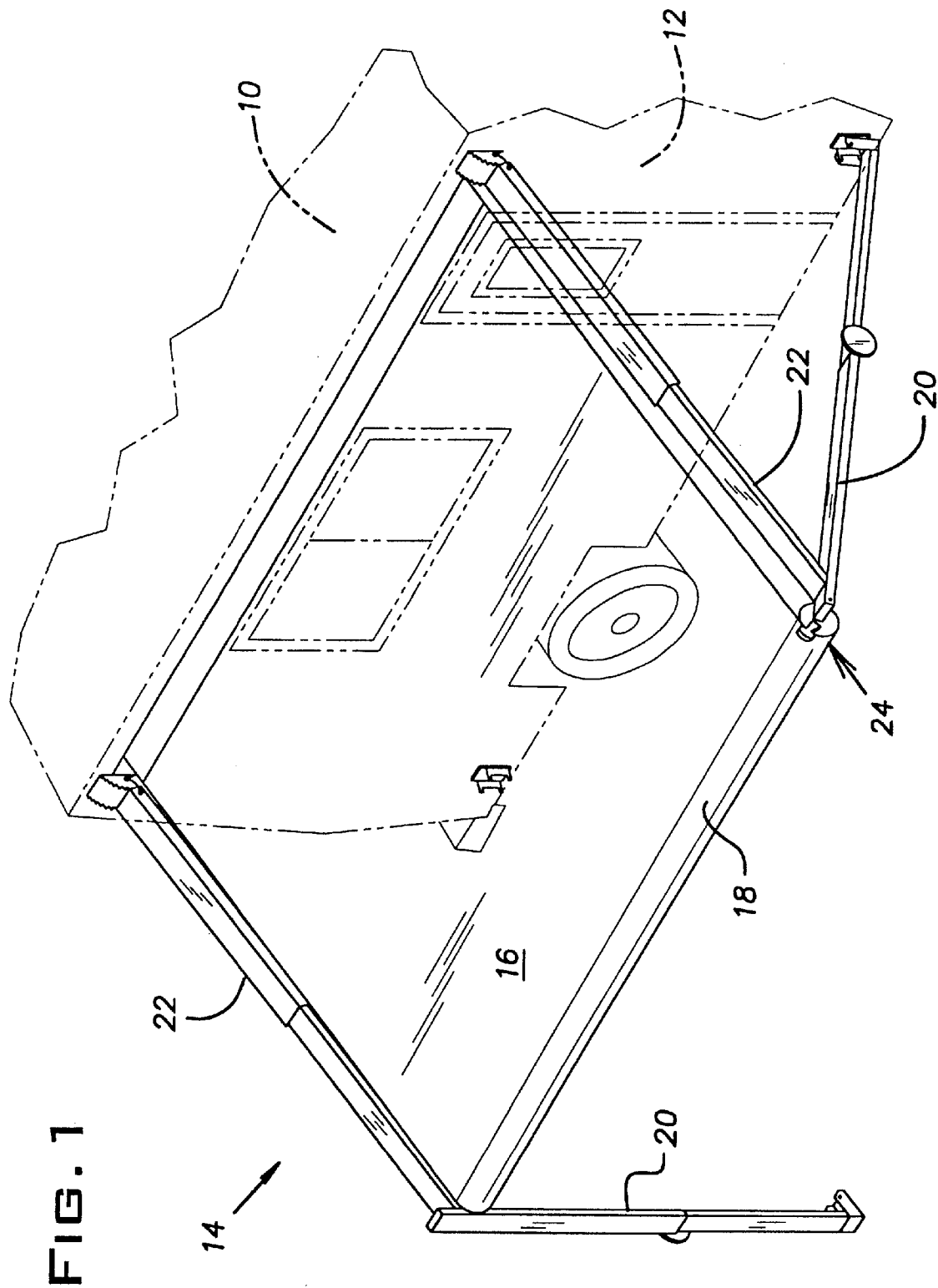
FIG. 1 shows a vehicle having an awning according to the invention installed thereon.

Referring to FIG. 1, a vehicle 10 includes a side wall 12 having an awning assembly 14 mounted thereon. The awning assembly 14 includes a canopy 16 having a proximal edge secured to the wall 12. A distal edge of the canopy 16 is secured to a roller 18. The roller 18 is supported at its ends by a pair of support arms 20 removably secured to the side wall 12. Tension on the canopy is maintained by a pair of extendable rafters 22 secured at upper ends of the support arms 20. A roller lock 24 is provided at an end of the roller 18.

Figure 2:
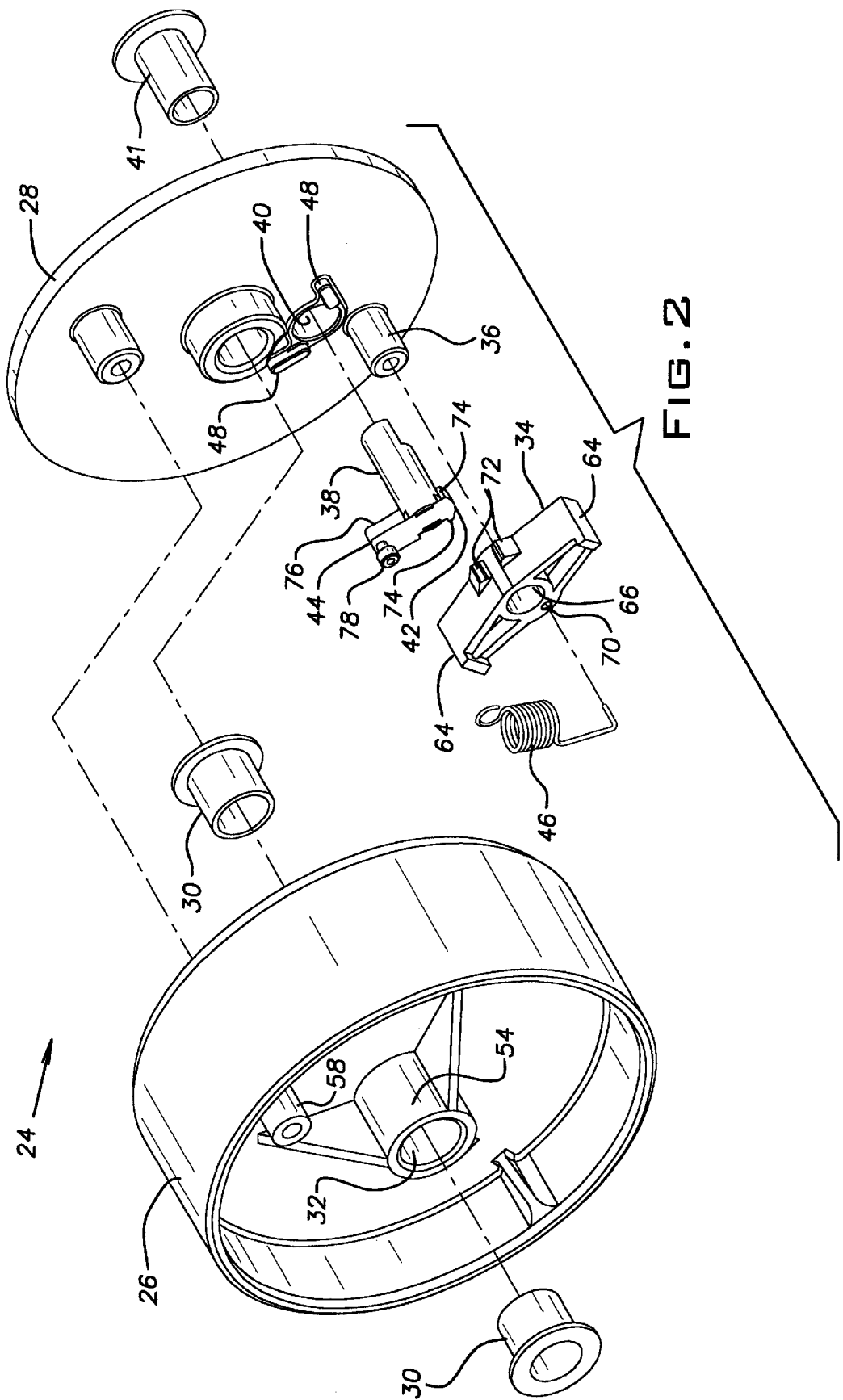
FIG. 2 shows an exploded view of lock components for the awning.

Referring to FIG. 2, the roller lock 24 includes a hub 26 and an end cap 28. A pair of axle bearings 30 are inserted in a central passage 32 of the hub. A pawl 34 is pivotably mounted on a pawl pivot 36 projecting from a face of the end cap 28. A lever shaft 38 extends through a shaft passage 40 provided with a shaft passage bearing 41 in the end cap 28. A lever 42 projects laterally from an end of the shaft 38. A spring mount 44 projects radially from the end of the shaft 38 in a direction opposite to the lever 42. A spring 46 is connected to the pawl 34 and the spring mount 44. A pair of lever stops 48 are provided adjacent the shaft passage 40.

Figure 3:
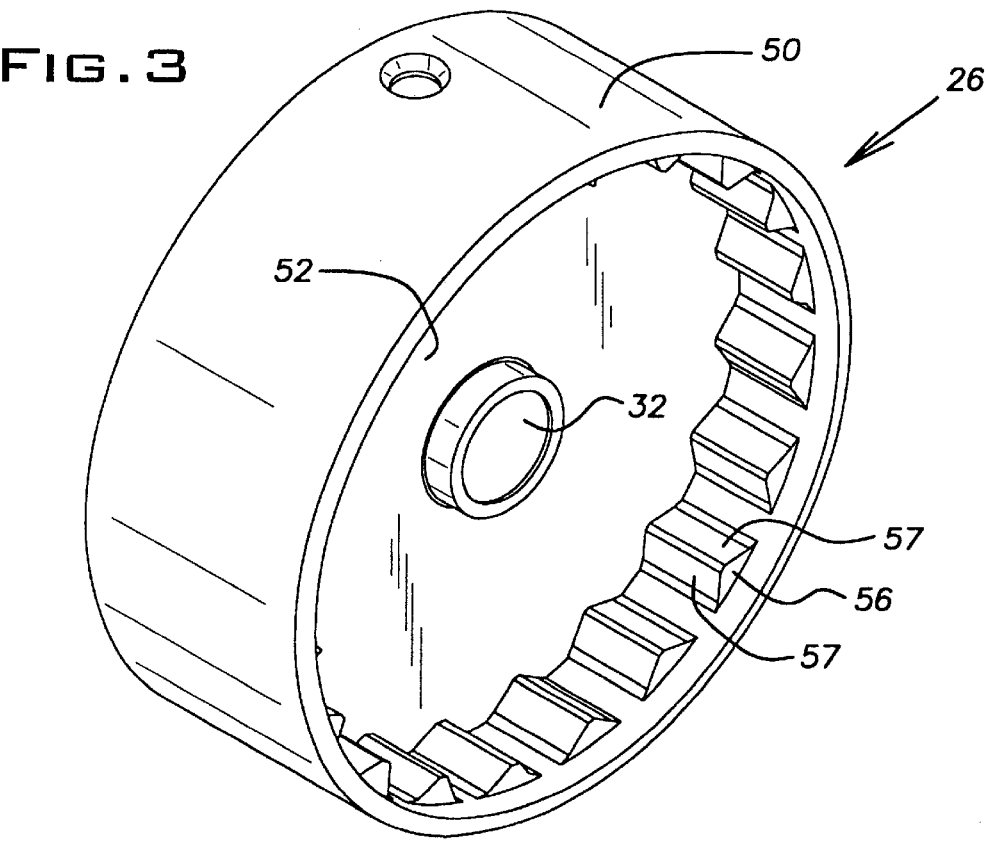
FIG. 3 shows a hub of the awning.

Referring to FIGS. 2 and 3, the hub 26 includes a ring 50 and an interior disk 52. The central passage 32 passes through the disk 52 and includes a bushing 54 on an interior face of the disk 52. An interior surface of the ring 50 on the exterior side of the disk 52 is provided with gears 56. Each gear includes a pair of opposed faces 57 joining at a rounded angle. An offcenter passage having an extended boss defines a hub portion of a locking pin receptacle 58.

Figure 4:
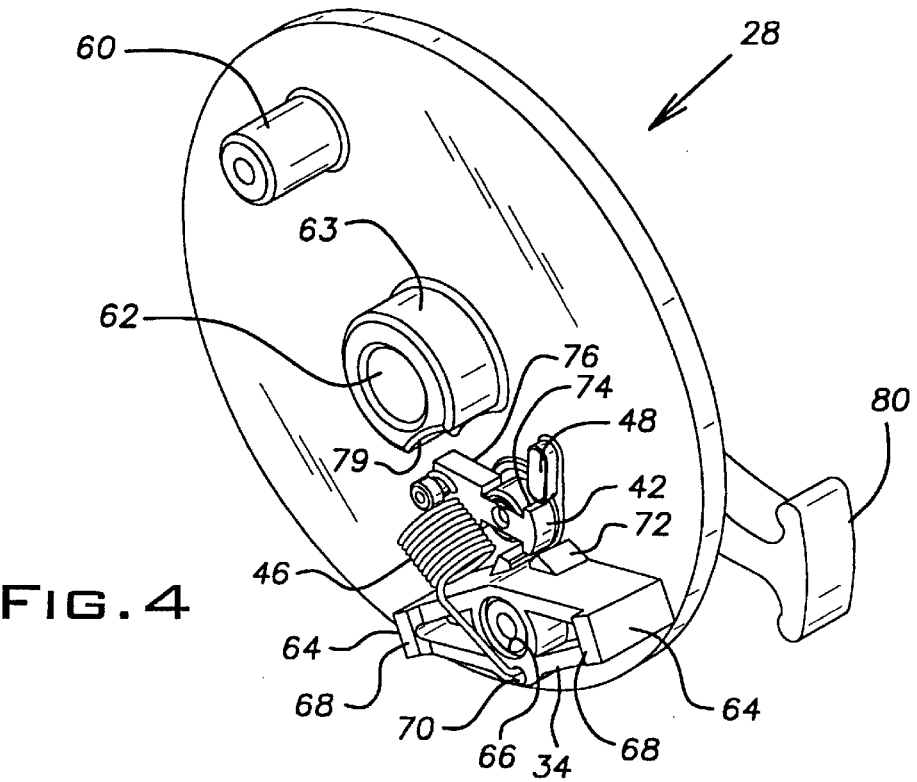
FIG. 4 shows an end cap assembly of the awning.

Referring to FIGS. 2 and 4, the end cap 28 is a circular disk provided with an offcenter passage and an extended boss defining a cap portion of a locking pin receptacle 60. A central passage 62 formed by a boss 63 corresponds with the central passage 32 of the hub 26.

The pawl 34 includes two abutment surfaces 64 spaced radially from a central passage 66. Projecting bearing surfaces 68 are provided on an interior face of the pawl 34 for bearing on the exterior surface of the hub disk 52. A spring mount hole 70 is provided adjacent the central passage 66, offcenter with respect to a pivot axis of the pawl 34. A pair of shoulders 72, defined by projections or a recess, are positioned along a side of the pawl 34 facing the lever 42. The shaft passage 40 is disposed so that the shaft 38 and pawl pivot 36 have parallel longitudinal axes. The pawl pivot 36 and shaft 38 are disposed such that the lever 42 nests between the two shoulders 72. The lever 42 defines drive surfaces 74 at opposite ends thereof. The drive surfaces 74 are positioned to engage the respective shoulders 72 when the shaft 38 is pivoted. An arm 76 projects radially from the shaft 38 in a direction opposite from the lever 42. The lever stops 48 are positioned to limit travel of the arm 76. A spring mount 78 projects from an end of the arm 76 in a direction parallel to the shaft 38. The spring mount 78 includes a post on which a curled end of the spring 46 can be hooked and a cap retaining the spring on the post. A recessed arc 79 in the boss 63 around the central passage 62 provides clearance for pivoting of the arm 76. A handle 80 located on an exterior face of the cap 28 is mounted for pivoting the shaft 38.

Figure 5:
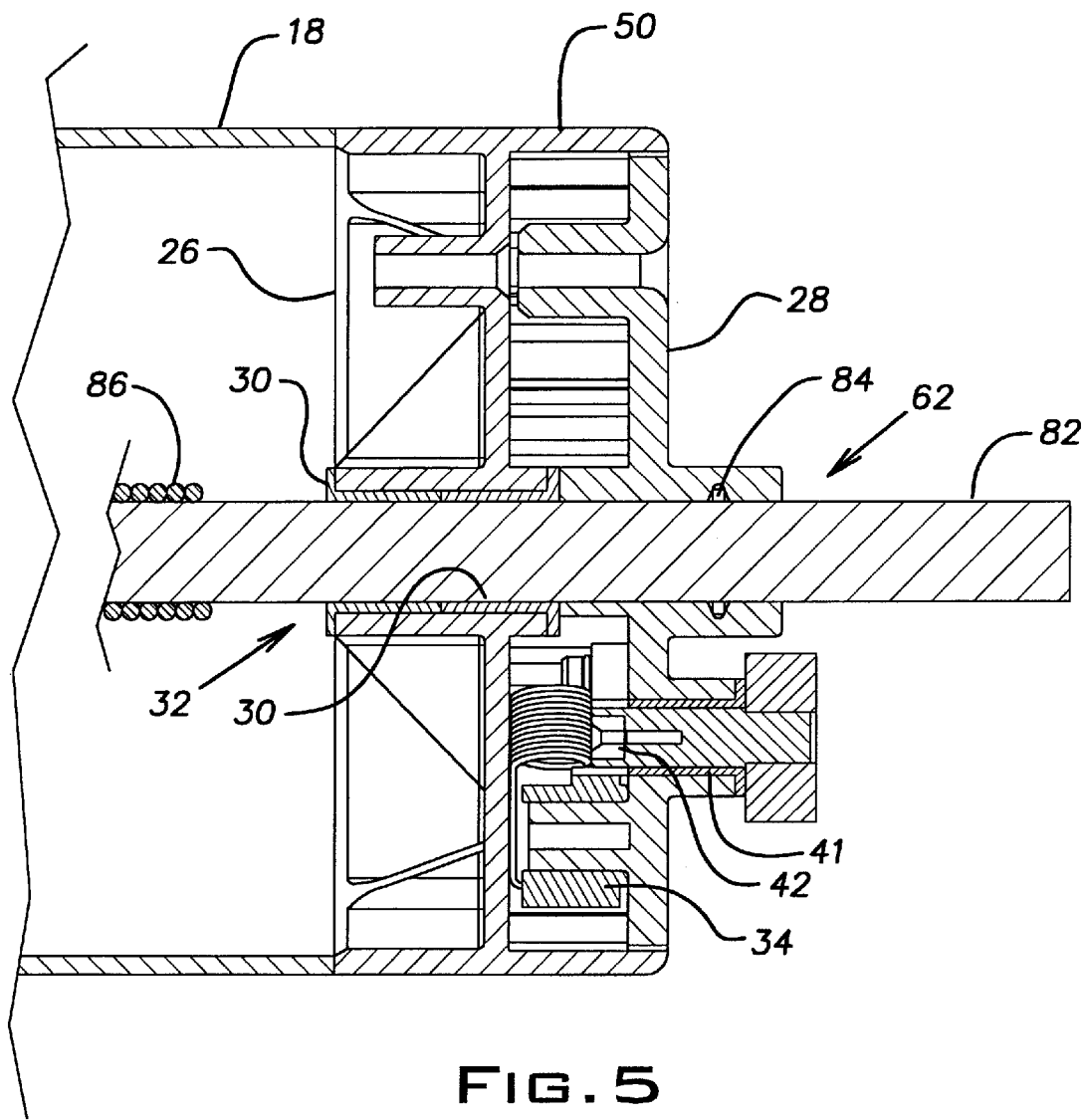
FIG. 5 shows a sectional view of the lock components.

Referring to FIG. 5, the end cap 28 nests in the hub 26 and is surrounded by the ring 50. The pawl 34 and lever 42 are captured between the end cap and hub. The central passages 32, 62 are aligned and receive an axle 82 of the roller 18. The axle 82 is fixed to the end cap 28 by a pin 84. The roller 18 and hub 26 rotate on the axle 82 and the end cap 28 is stationary relative to the axle. A torsion spring 86 urges rotation of the roller 18 on the axle 82 in one direction. Rotation is facilitated by the bearings 30. The axle 82 is supported by one of the support arms 20 (FIG. 1).

In operation, the awning assembly 14 is in a retracted position wherein the canopy 16 is rolled on the roller 18 and the roller is disposed adjacent the wall 12. The roller lock 24 is in a "roll up" position, which prevents deployment of the awning. To deploy the awning, the roller lock 24, by operation of the handle 80, is moved to a "roll down" position. Movement of the handle 80 moves the arm past a center position, which overcomes the force of the spring 46. The lever moves so that one of the drive surfaces 74 engages one of the shoulders 72 causing the pawl 34 to pivot. Pivoting of the pawl 34 causes one end of the pawl to be withdrawn from between two of the gears 56. Pivoting of the pawl 34 causes the other end of the pawl to nest between two of the gears 56 such that the abutment surface 64 engages one of the faces 57 of one of the gears. If, when the pawl is pivoted, the end of the pawl does not nest between the gears, the spring will cause the pawl to drop into engagement with one of the gears, and thus stop rotation of the hub when the abutment surface is flush against the face 57.

The roller 18 can now be rotated such that the canopy 16 unrolls therefrom. The end of the pawl 34 nesting between the gears 56 successively passes over each of the gears as the hub 26 rotates with the roller. The torsion spring 86 biases the roller in the opposite direction. The pawl prevents 34 rotation in the opposite direction by engagement of the abutment surface 64 against one of the faces 57. A bottom face of the lever 42 is configured and positioned relative to the shoulder 72 to prevent the pawl 34 from pivoting past the center position as the roller 18 is rotating and thus prevent the pawl from undesirably engaging a face 57 on the wrong side.

To retract the awning, the handle 80 is operated to move the pawl thereby disengaging the contact surface 64 from the gear face 57. Movement of the pawl causes the other contact surface 64 to engage one of the faces 57 of one of the other gears 56. The roller lock 24 now permits rotation of the roller in a direction that will wind the canopy 16 onto the roller 18 and prevents rotation in the opposite direction. The torsion spring 86 causes the roller to rotate thereby winding the canopy onto the roller and retracting the awning.

As the roller rotates, the pawl travels over the geared surface, pivoting slightly in a ratcheting motion. Because the lever and pawl pivot separately and are not rigidly linked, the handle does not move with the pawl during this ratcheting.

The present disclosure describes several embodiments of the invention, however, the invention is not limited to these embodiments. Other variations are contemplated to be within the spirit and scope of the invention and appended claims.

What is claimed is:

1. A roller lock comprising:
    an axle;
    a hub disposed for rotation on the axle and having a geared surface;
    a cap mounted stationary relative to the axle;
    a pawl pivot mounted to the cap;
    a pawl having two abutment surfaces and mounted for rotation on the pawl pivot between a first position wherein one of the abutment surfaces engages the geared surface to prevent rotation of the hub in a first direction and permit rotation in a second direction and a second position wherein the other abutment surface engages the geared surface to prevent rotation of the hub in the second direction and permit rotation in the first direction;
    a lever shaft mounted to the cap;
    a handle for pivoting the lever shaft; and
    a lever mounted to the lever shaft and operated by the handle to engage and rotate the pawl.

2. The roller lock according to claim 1 wherein the geared surface is an inwardly facing surface of an annular ring.

3. The roller lock according to claim 2 further comprising a roller on an end of which the hub is mounted and wherein the annular ring extends longitudinally away from the roller.

4. The roller lock according to claim 1 wherein the cap includes axial projections defining stops limiting rotational travel of the lever.

5. The roller lock according to claim 1 further comprising a spring biasing the pawl toward a respective one of the first and second positions to which the lever has rotated the pawl.

6. The roller lock according to claim 5 further comprising a first spring mount projecting radially from the shaft and a second spring mount disposed at the pawl in an offcenter position with respect to a rotational axis of the pawl, wherein the spring is secured to the first and second spring mounts.

7. The roller lock according to claim 1 wherein the pawl includes shoulders for being engaged by the lever, the shoulders being positioned so that operation of the lever in one direction engages one of the shoulders to rotate the pawl in one direction and operation of the lever in another direction engages another of the shoulders to rotate the pawl in another direction.

8. The roller lock according to claim 7 wherein the lever nests between the shoulders.

9. The roller lock according to claim 7 wherein the shoulders and lever are shaped and positioned such that the lever engages one of the shoulders to limit rotation of the pawl thereby preventing engagement of the pawl with a gear surface preventing rotation in a desired direction.

10. The roller lock according to claim 1 wherein the abutment surfaces are parallel, oppositely facing surfaces radially spaced from the pawl pivot.

11. The roller lock according to claim 1, wherein the lever includes a pair of parallel, spaced drive surfaces laterally offset from an axial centerline of the lever shaft.

12. The roller lock according to claim 1 wherein the cap and hub are provided with passages that can be aligned and further comprising locking pin that can be inserted in the aligned passages to prevent relative rotation of the cap and hub.

13. The roller lock according to claim 1 further comprising a roller on which the hub is mounted and a spring urging rotation of the roller in at least one direction.

14. A roller lock comprising:

an axle;

a hub disposed for rotation on the axle and having a geared inwardly facing annular surface;

a cap mounted stationary relative to the axle;

a pawl pivot mounted to the cap;

a pawl having a pair of parallel, oppositely facing abutment surfaces radially spaced from the pawl pivot and mounted for rotation on the pawl pivot between a first position wherein one of the abutment surfaces engages the geared surface to prevent rotation of the hub in a first direction and permit rotation in a second direction and a second position wherein the other abutment surfaces engages the geared surface to prevent rotation of the hub in the second direction and permit rotation in the first direction;

a spring biasing the pawl toward a respective one of the first and second positions to which the lever has rotated the pawl;

a lever shaft mounted to the cap;

a handle for pivoting the lever shaft; and a lever having a pair of parallel, spaced drive surfaces laterally offset from an axial centerline of the lever shaft, mounted to the lever shaft, and operated by the handle to engage and rotate the pawl, wherein the pawl includes shoulders for being engaged by the lever drive surfaces, the shoulders being positioned so that operation of the lever in one direction rotates the pawl in one direction and operation of the lever in another direction rotates the pawl in another direction and the lever nests between the shoulders.

15. A roller lock comprising:

a pawl movable to prevent rotation of a roller on which the lock is adopted to be mounted;

a handle adopted to be amounted on an axis displaced from a rotational axis of the roller pivoting separately from the pawl;

a lever operated by the handle and mounted to engage the pawl to cause rotation of the pawl; and a spring biasing the pawl and the lever.

16. A roller lock according to claim 15 further comprising a geared surface of the roller engaged by the pawl, wherein the pawl prevents rotation of the roller in one direction and permits rotation of the roller in another direction and travel of the pawl over the geared surface during rotation of the roller does not cause movement of the handle.

* * * * *